United States Patent [19]
Siedenburg et al.

[11] 4,282,397
[45] Aug. 4, 1981

[54] WRAPAROUND SPLICE CASE

[75] Inventors: Juergen Siedenburg, San Carlos; Joel L. Fritsche, Redwood City, both of Calif.

[73] Assignee: Raychem Corporation, Menlo Park, Calif.

[21] Appl. No.: 91,344

[22] Filed: Nov. 5, 1979

[51] Int. Cl.³ .................. H02G 15/113; H02G 15/196
[52] U.S. Cl. ......................................... 174/92; 428/36
[58] Field of Search .......... 174/92, DIG. 8, DIG. 11, 174/91, 93; 428/36

[56] References Cited
U.S. PATENT DOCUMENTS

| | | | |
|---|---|---|---|
| 3,379,218 | 4/1968 | Conde | 174/DIG. 11 |
| 3,701,835 | 10/1972 | Eisele et al. | 174/92 |
| 3,770,556 | 11/1973 | Evans et al. | 174/DIG. 8 |
| 4,142,592 | 3/1979 | Brusselmans | 174/92 |
| 4,176,245 | 11/1979 | Merlack et al. | 174/92 |

*Primary Examiner*—Roy N. Envall, Jr.
*Attorney, Agent, or Firm*—Lyon & Lyon

[57] ABSTRACT

A wraparound cable splice case comprises a hollow, relatively rigid, cylindrical shell having at least one longitudinal split along its length and a plastic sheet bonded to its outer surface. A closure member comprises an extension of the plastic sheet extending beyond one of the longitudinal edges along the split. The splice case can be opened along the longitudinal split, wrapped around a cable splice, then closed to encircle the splice. The closure member is coated on its inner surface with a heat activatable adhesive so that when the case is closed around the splice and heat is applied, the adhesive bonds the closure member to the plastic sheet covering the shell. The splice case is particularly suitable for protecting a splice in armored power cable.

9 Claims, 2 Drawing Figures

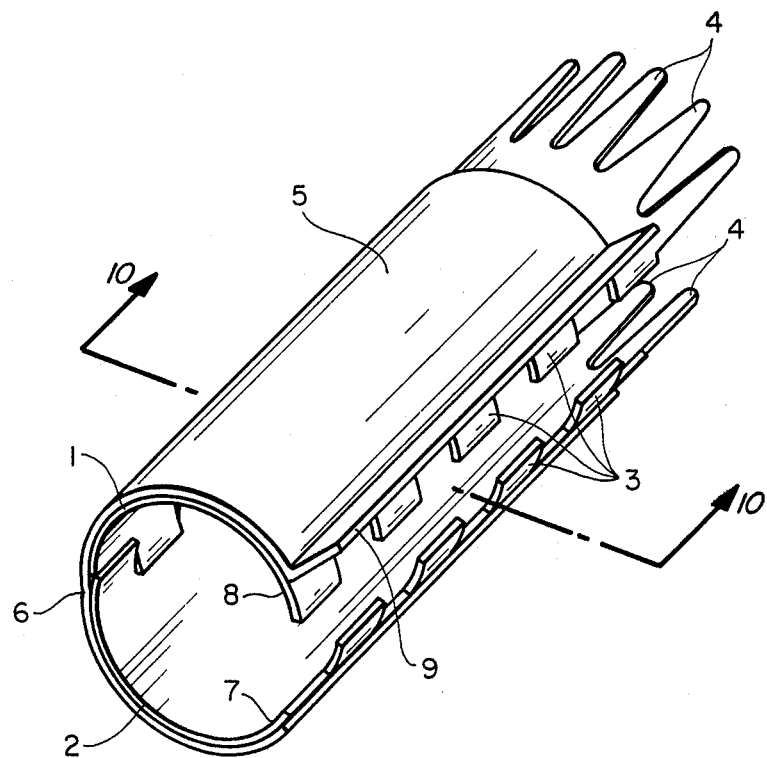
FIG_1
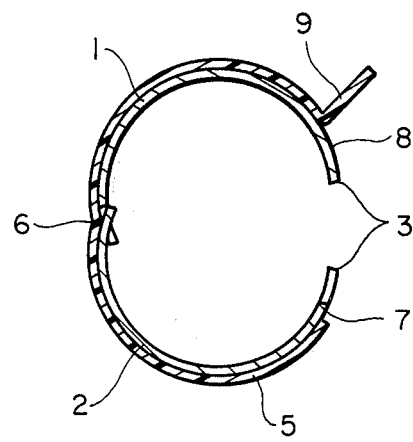
FIG_2

WRAPAROUND SPLICE CASE

BACKGROUND OF THE INVENTION

1. Field of the Invention

This invention relates to a wraparound splice case to insulate and protect a splice in a cable.

2. Discussion of the Prior Art

U.S. Pat. No. 4,142,592 to Brusselmans discloses an assembly for protecting and insulating a junction such as a splice between cables. The assembly includes a relatively rigid longitudinally split tube which is positioned about the junction. The assembly also includes relatively rigid support means, such as rings, which are positioned at the end of the tube. A plurality of flexible prongs, which may be attached to or formed integrally with said support means, project longitudinally at spaced intervals around the circumference of at least one end of the tube. A heat shrinkable sleeve of length greater than the length of the tube, support means and prongs, is disposed about the tube, support means and prongs. At least a part of the inner wall of the heat shrinkable sleeve is provided with a sealant so that on shrinking, the end regions of the sleeve overlying the free ends of the prongs are shrunk down over the conduits (or cables) and are sealed thereto. The heat shrinkable sleeve can be of any suitable material.

Wraparound splice case assemblies, identified as XAGA 800 and XAGA 900, are available commercially from Raychem Corporation. The wraparound assembly includes an inner tubular member, which can be two metal half-cylinders, and a heat shrinkable sleeve of a length greater than the length of the inner member. The wraparound assembly is positioned about the cable splice. The heat shrinkable sleeve is fastened with a closure rail device, such as that described in U.S. Pat. No. 3,455,336 to Ellis and is then heat shrunk over the inner member and underlying cable. The assembly is provided in kit form with the metal half-cylinders attached to the inner surface of the heat shrinkable sleeve with two strips of pressure sensitive adhesive strips.

U.S. Pat. No. 3,875,325 to C. V. Anderson et al. discloses a telephone splice closure. The closure consists of two mating shells which have tapered mouth portions to accommodate a range of cable outside diameters. The two mating half-shells are hinged together to make a one piece cover. The non-hinged side of the half shells are provided with ridges which are fastened together with a channel after the closure is positioned about cable.

SUMMARY OF THE INVENTION

The wraparound splice case of this invention comprises:

(a) a hollow cylindrical shell of a relatively rigid material, said shell having an internal diameter sufficient to encircle a cable splice and having at least one longitudinal split extending along the length thereof so that the shell can be opened to be placed about a cable splice and then closed to completely encircle the cable splice;

(b) a sheet of plastic material bonded to the outer surface of said shell; and (c) a closure member which comprises an extension of said plastic sheet extending from one of the edges of said shell along said longitudinal split, said closure member being coated on the inner surface thereof with a heat activatable adhesive so that when the shell is placed about a cable splice and the closure member is placed in contact with said plastic material covering said shell and heated, the adhesive bonds the closure member to the plastic material thereby forming a protective splice case.

BRIEF DESCRIPTION OF THE DRAWINGS

FIG. 1 illustrates a wraparound splice case of this invention.

FIG. 2 is a cross-section of the splice case of FIG. 1 along the line 10—10.

DETAILED DESCRIPTION OF THE INVENTION

The hollow cylindrical shell of the splice case has a longitudinal split extending along its length so that it can be opened along the split and readily placed around a cable splice. The shell can be made of a single sheet of material, in which case the shell must be sufficiently flexible to permit it to be opened along the longitudinal split and placed around a cable splice. It is preferred, however, to use a shell which has two longitudinal splits and is thus in the form of two half-cylinders with two pairs of corresponding longitudinal edges. One pair of longitudinal edges will act as a hinge when the other pair is opened. The shell is made of a relatively rigid material, preferably a metal, such as aluminum or steel. The shell can also be prepared from a relatively rigid plastic such as a high density polyethylene, polypropylene, polyvinyl chloride or the like. In a preferred embodiment of the invention, the shell comprises two galvanized steel half-cylinders having two pairs of interlocking longitudinal edges.

A sheet of plastic material is bonded to the outer surface of the shell. The plastic sheet is preferably dimensionally stable on application of heat. However a heat-shrinkable sheet can be used, if desired. The heat shrinkable sheet can be uniaxially or biaxially heat shrinkable. When a uniaxially heat shrinkable sheet (i.e. one that shrinks in one direction only) is used, it is preferred to place the sheet so that it shrinks in the circumferential direction, thereby aiding in holding the case in a closed position.

The plastic sheet can be made of any suitable plastic material. It is particularly preferred to use a sheet of crosslinked polyethylene.

The plastic sheet is generally bonded to the shell with an adhesive. A heat sealable sheet which is itself capable of bonding to the outer surface of the shell when heat is applied can also be used. To improve bonding between the plastic sheet and the shell, the outer surface of the shell can be coated with a primer composition. For example, if the shell is of galvanized steel, a primer composition containing zinc chromate can be used. Suitable adhesives for bonding the sheet to the shell are well known in the art. For example, adhesive compositions which can be used are disclosed in U.S. Pat. Nos. 3,983,070 of Penneck, 4,018,733 of Lopez et al. and 4,117,027 of Johnson et al., the disclosures of which are hereby incorporated by reference. Preferred adhesive compositions are modified ethylene/vinyl acetate copolymer or modified ethylene/ethyl acrylate copolymer hot melt adhesives.

As stated above, the plastic sheet is bonded to the outer surface of the hollow cylindrical shell. Generally the sheet will extend completely around the shell from one edge along the longitudinal split to the other. When the shell comprises a pair of half-cylinders having two pairs of corresponding longitudinal edges, the plastic sheet extends from one longitudinal edge of one half-cylinder around the outer circumference of both half-cylinders, thus holding the two half-cylinders together and forming a hinge where they meet. In many uses of the splice case it is important that the case be waterproof. To ensure that this hinge remains waterproof, a strip of adhesive, such as mastic can be placed at the hinge between the longitudinal edges of the half shells and the plastic sheet.

The closure member comprises an extension of the plastic sheet extending beyond one of the longitudinal edges. The interior surface of the closure is coated with adhesive and when the case is closed around the cable splice, the closure can be sealed to the plastic covered shell, forming a waterproof seal. The adhesive can be the same as that used to bond the plastic sheet to the shell. It is preferred to use a plastic sheet coated on one side with an adhesive to form both the plastic covering for the shell and the closure member. It is, however, possible to bond the plastic sheet to the shell using one adhesive and apply a different adhesive to the extension of the sheet which forms the closure member. If a sheet of heat sealable plastic material is used, the adhesive coating on the interior surface of the closure member is not necessary.

Generally, the plastic sheet is placed over the entire outer surface of the shell and when the shell is closed around the splice, the closure member is sealed to the plastic sheet. At times it may be desirable to place the plastic sheet set back from the longitudinal edge so that when the shell is closed around the splice the closure member is sealed to a portion of the shell as well as to the plastic sheet. Sealing the closure member directly to the shell in this manner is advantageous when the adhesive on the inner surface of the closure is one which forms a stronger bond with the material of the shell than with the plastic material. For example, if the shell is made of galvanized steel and the adhesive is one which yields a particularly strong bond with galvanized steel, it is preferred that the closure member bond in part to the shell. To ensure a waterproof seal the closure should overlap and be sealed to the plastic sheet as well as to the shell.

To provide a completely waterproof structure about the splice, the ends of the case can be enclosed in some manner with weatherproofing material. It is preferred to place two heat shrinkable sleeves over the adjacent sections of the case and underlying cable. The interior surfaces of the sleeves are coated with an adhesive or sealant so that on heat shrinking of the sleeves they become sealed to the case and adjacent sections of the cable. Preferably, the adhesive is a hot melt adhesive, for example an amorphous polyamide hot melt adhesive. The heat-shrinkable sleeves can be closed cylindrical sleeves of heat-shrinkble polymeric material as disclosed, for example, in U.S. Pat. Nos. 3,086,242 to Cook and 3,243,211 to Witmore or longitudinally split cylindrical heat-shrinkable sleeves such as those disclosed in U.S. Pat. No. 3,455,336 to Ellis and U.S. Pat. No. 3,379,218 to Conde. The heat-shrinkable sleeve is preferably of a polyolefin such as polyethylene, cross-linked by chemical means or by irradiation and containing the conventional additives.

If the internal diameter of the splice case is significantly greater than the outer diameter of the underlying cable, the splice case can be provided with a tapered end section. The tapered end section can be cone shaped as for example, in the splice case disclosed in U.S. Pat. No. 3,875,325 or comprise tapered prongs or fingers as taught in U.S. Pat. No. 4,142,592. The tapered end section prevents splitting of the end sleeves as they shrink down over the case and cable. The tapered section provides a smooth transition from the outer diameter of the case to the underlying cable. As disclosed in U.S. Pat. No. 4,142,592 the prongs can be integral with the shell or attached to separate support means. In a preferred embodiment, the case is provided with a plurality of prongs extending longitudinally from the shell. The heat-shrinkable sleeves are provided with sufficient hot melt adhesive so that when the sleeves are subjected to heat shrinking, the adhesive melts, thus filling the spaces between the prongs. On cooling, the adhesive solidifies forming a consolidated structure having improved strength and impact resistance.

Turning now to the drawings, FIG. 1 illustrates a preferred embodiment of the invention. In FIG. 1, the hollow cylindrical shell comprises two metal half-cylinders, 1 and 2, which have interlocking longitudinal edges. The longitudinal edges comprise offsetting tabs, 3, which interlock when the half-cylinders are brought together to form the shell. Each half-cylinder, 1 and 2, includes prongs, 4, extending longitudinally from each end thereof (Prongs are shown on one end only so that the relationship between the shell, the plastic sheet and closure member can be more clearly illustrated in the drawing). A plastic sheet, 5, is bonded to the outer surface of the half-cylinders forming a hinge, 6, with the adjacent interlocking edges. The plastic sheet extends from longitudinal edge, 7, around the outer surface of the half-cylinders to longitudinal edge, 3, and beyond forming closure member, 9. The closure member, 9, is coated on the interior surface with sealant or hot melt adhesive. Not shown in the drawing are two heat-shrinkable sleeves which are positioned over the prong sections after the case has been closed around a splice. On heat shrinking, the sleeves are sealed to the end regions of the case, the prongs and the adjacent sections of the underlying cable, to form a waterproof structure.

FIG. 2 shows a cross-section of the splice case of FIG. 1 along the line 10—10. In FIG. 2, the hollow cylindrical shell comprises two half-cylinders, 1 and 2, with interlocking longitudinal edges comprising offsetting tabs, 3. Plastic sheet, 5, is bonded to the outer surface of the half-cylinders, thus forming a hinge, 6, between the adjacent interlocking edges. The plastic sheet extends from longitudinal edge, 7, around the outer surface of the half-cylinders to longitudinal edge, 8, and beyond forming closure member, 9. As described above, this invention also includes a splice case in which plastic sheet, 5, is set back from longitudinal edge, 7, so that the closure member will bond directly to shell, 2, as well as plastic sheet, 5.

The wraparound splice case of this invention is particularly suitable for use with armored power cables. However, it may be used to protect splices, or junctions, in other types of cables, such as telephone cables.

We claim:
1. A splice case comprising:
   (a) a hollow cylindrical shell of a relatively rigid material, said shell having an internal diameter sufficient to encircle a cable splice; and having at least one longitudinal split extending along the length thereof so that the shell can be opened to be placed about a cable splice and then closed to completely encircle the cable splice;

(b) a sheet of plastic material bonded to the outer surface of said shell; and (c) a closure member which comprises an extension of said plastic sheet extending from one of the edges of said shell along said longitudinal split, said closure member being coated on the inner surface thereof with a heat activatable adhesive so that when the shell is placed about a cable splice and the closure member is placed in contact with said plastic material covering said shell and heated, the adhesive bonds the closure member to the plastic material, thereby forming a protective splice case.

2. A splice case in accordance with claim 1 wherein said shell comprises two half-cylinders having two pairs of interlocking longitudinal edges.

3. A splice case in accordance with claim 2 wherein said half-cylinders are of metal.

4. A splice case in accordance with claim 3 wherein said half-cylinders are of galvanized steel.

5. A splice case in accordance with claim 2 wherein said shell is provided with a plurality of spaced apart prongs extending longitudinally from the ends of said shell.

6. A splice case in accordance with claim 5 wherein the splice case further comprises two heat shrinkable sleeves coated on the internal surface thereof with adhesive so that when said sleeves are positioned over the prongs and the adjacent sections of said splice case and underlying cable and heat is applied, the sleeves shrink down over the prongs, sealing said sleeves to said splice case, prongs and cable.

7. A splice case in accordance with claim 1 wherein said sheet of plastic material is heat shrinkable.

8. A splice case in accordance with claim 1 wherein said sheet of plastic material is composed of crosslinked polyethylene.

9. A splice case comprising:

(a) a hollow cylindrical shell of a relatively rigid material, said shell having an internal diameter sufficient to encircle a cable splice; and having at least one longitudinal split extending along the length thereof so that the shell can be opened to be placed about a cable splice and then closed to completely encircle the cable splice;

(b) a sheet of heat sealable plastic material bonded to the outer surface of said shell; and (c) a closure member which comprises an extension of said plastic sheet extending from one of the edges of said shell along said longitudinal split, said closure member being heat sealable so that when the shell is placed about a cable splice and the closure member is placed in contact with said plastic material covering said shell and heated, the closure member is bonded to the plastic material, thereby forming a protective splice case.

* * * * *